US010619553B2

(12) United States Patent
Watanabe (10) Patent No.: US 10,619,553 B2
(45) Date of Patent: Apr. 14, 2020

(54) ENGINE-CONTROLLING DEVICE

(71) Applicant: SUBARU CORPORATION, Tokyo (JP)

(72) Inventor: Masaaki Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 90 days.

(21) Appl. No.: 15/864,699

(22) Filed: Jan. 8, 2018

(65) Prior Publication Data

US 2018/0283258 A1    Oct. 4, 2018

(30) Foreign Application Priority Data

Mar. 30, 2017    (JP) .................................. 2017-066672

(51) Int. Cl.
*F01P 7/16* (2006.01)
*F01P 5/10* (2006.01)
(Continued)

(52) U.S. Cl.
CPC ...... *F01P 7/16* (2013.01); *F01P 5/10* (2013.01); *F01P 11/16* (2013.01); *F01P 11/18* (2013.01);
(Continued)

(58) Field of Classification Search
CPC .... F01P 7/16; F01P 11/18; F01P 11/16; F01P 5/10; F01P 2025/34; F01P 2007/146; F01P 2025/04; F02D 35/02
See application file for complete search history.

(56) References Cited

U.S. PATENT DOCUMENTS 5,092,298 A * 3/1992 Suzuki ............... F02D 11/107
123/361
6,640,168 B2 * 10/2003 Kastner .................. F01P 11/14
123/41.08
(Continued)

FOREIGN PATENT DOCUMENTS

CN    105074301 A       11/2015
CN    106232960 A  * 12/2016 .............. F01P 7/165
(Continued)

OTHER PUBLICATIONS

Japanese Office Action, dated Aug. 20, 2018, in Japanese Application No. 2017-066672 and English Translation thereof.
(Continued)

*Primary Examiner* — Hung Q Nguyen
*Assistant Examiner* — Brian P Monahon
(74) *Attorney, Agent, or Firm* — McGinn I. P. Law Group, PLLC.

(57) ABSTRACT

An engine-controlling device includes a coolant passage, a radiator, and a control valve. A coolant discharged from a pump circulates through the coolant passage. The radiator cools the coolant. The control valve includes a first valve that adjusts a flow rate of the coolant to be introduced into the radiator and that includes a valve member driven by an electric actuator, a second valve that is arranged in parallel with the first valve and that includes a valve member that is opened in accordance with a pressure or a temperature, and a malfunction-diagnosing unit that detects a valve-stuck malfunction of the first valve. An output of the engine is limited to an output equal to or less than a limiting value determined on a basis of a maximum flow rate of the coolant introduced into the radiator from the second valve when the valve-stuck malfunction of the first valve occurs.

20 Claims, 4 Drawing Sheets

(51) Int. Cl.
*F01P 11/16* (2006.01)
*F02D 35/02* (2006.01)
*F01P 11/18* (2006.01)
*F02D 41/22* (2006.01)
*F01P 7/14* (2006.01)

(52) U.S. Cl.
CPC ............. *F02D 35/02* (2013.01); *F02D 41/22* (2013.01); *F01P 2007/146* (2013.01); *F01P 2025/04* (2013.01); *F01P 2025/34* (2013.01); *F01P 2031/00* (2013.01); *F02D 2041/227* (2013.01); *F02D 2200/021* (2013.01); *F02D 2250/26* (2013.01); *Y02T 10/40* (2013.01)

(56) References Cited

U.S. PATENT DOCUMENTS

| | | | | |
|---|---|---|---|---|
| 7,885,756 | B2* | 2/2011 | Livshiz | F02D 11/105 123/299 |
| 8,794,194 | B2* | 8/2014 | Takiguchi | F01P 7/167 123/41.08 |
| 2002/0156569 | A1* | 10/2002 | Masuda | F01P 11/14 701/114 |
| 2005/0006487 | A1* | 1/2005 | Suda | F01P 7/167 236/46 R |
| 2005/0228577 | A1* | 10/2005 | Wakahara | F01P 11/14 701/114 |
| 2011/0125361 | A1* | 5/2011 | Weber | F01P 11/18 701/31.4 |
| 2014/0123918 | A1* | 5/2014 | Nethercutt | F01P 7/16 123/41.08 |
| 2014/0216368 | A1* | 8/2014 | Sasaki | F01P 7/16 123/41.08 |
| 2016/0010536 | A1* | 1/2016 | Murakami | F16K 11/085 137/625.44 |
| 2016/0090898 | A1* | 3/2016 | Takahashi | F01P 7/167 123/41.05 |
| 2016/0186647 | A1* | 6/2016 | Styron | F01P 11/18 123/41.02 |
| 2017/0074155 | A1* | 3/2017 | Shimomura | F01P 7/16 |
| 2017/0096929 | A1* | 4/2017 | Kaneko | F01P 3/20 |
| 2017/0362993 | A1* | 12/2017 | Seo | F01P 11/14 |

FOREIGN PATENT DOCUMENTS

| | | | |
|---|---|---|---|
| JP | 3859307 | B2 | 12/2006 |
| JP | 2013-024188 | A | 2/2013 |
| JP | 2013024188 | A * | 2/2013 |
| JP | 2014-001664 | A | 1/2014 |
| JP | 2014001654 | A * | 1/2014 |
| JP | 2016-065517 | A | 4/2016 |
| JP | 2016065517 | A * | 4/2016 |
| JP | 2016-128652 | A | 7/2016 |
| JP | 2016128652 | A * | 7/2016 |

OTHER PUBLICATIONS

Chinese Office Action dated Mar. 28, 2019, in Chinese Application No. 201810001798.x and English Translation thereof.

* cited by examiner

FIG. 4

ENGINE-CONTROLLING DEVICE

CROSS-REFERENCE TO RELATED APPLICATIONS

The present application claims priority from Japanese Patent Application No. 2017-066672 filed on Mar. 30, 2017, the entire contents of which are hereby incorporated by reference.

BACKGROUND

1. Technical Field

The present invention relates to an engine-controlling device, and more particularly, to an engine-controlling device that prevents the occurrence of overheating even when a control valve for a radiator flow rate malfunctions.

2. Related Art

A water-cooled engine that is installed in, for instance, an automobile includes a cooling system that causes a cooling water discharged from a water pump driven by an output shaft of the engine to pass through a water jacket (cooling water passage) formed in portions, such as a cylinder head, that are needed to be cooled and subsequently to circulate to the water pump via a radiator, which is a heat exchanger that cools the cooling water by using, for instance, air during travelling.

Such a cooling system includes a bypass passage through which the cooling water bypasses a radiator passage to prevent the cooling water from being excessively cooled, for instance, during cold, and a heater passage through which the cooling water as a heat source is introduced into a heater for heating.

The cooling system has a function of adjusting the amount of water that flows through the radiator in accordance with a warm-up state of the engine.

Conventionally, thermostatic valves that open due to thermal expansion of a wax element in response to an increase in the temperature of the cooling water are widely used. In recent years, however, it is proposed that a metering valve that is electrically controllable is installed, and the amount of water that flows through the radiator, for instance, is adjusted to more appropriately manage the heat of the engine and auxiliary machines.

For instance, Japanese Patent No. 3859307 discloses a related art of such a cooling system in which a thermostatic control valve and a solenoid control valve are installed in parallel to control the amount of water that flows through the radiator.

Japanese Unexamined Patent Application Publication (JP-A) No. 2016-65517 discloses that, when a valve-stuck malfunction of a flow-rate control valve occurs, the output of the engine is limited in accordance with the amount of water that flows at the degree of opening in a stuck state to prevent overheating and to inhibit the output from decreasing during travelling in a limp-home mode.

According to JP-A No. 2016-65517, it is necessary to appropriately detect the degree of valve opening on the occurrence of a malfunction of the flow-rate control valve. Accordingly, in the case where a detector of the degree of valve opening also malfunctions, the overheating cannot be prevented.

In the case where the valve is stuck in a state where the degree of valve opening is low, the amount of water that flows through the radiator cannot be ensured. Accordingly, the output is greatly limited, and it is difficult to obtain the output needed for travelling of vehicle in the limp-home mode.

SUMMARY OF THE INVENTION

In view of the above problems, it is desirable to provide an engine-controlling device that prevents the occurrence of overheating even when the control valve for the radiator flow rate malfunctions.

An engine-controlling device includes a pump, a coolant passage, a radiator and a control valve. The pump is configured to discharge a coolant of an engine in conjunction with an output shaft of the engine. The coolant passage is configured such that the coolant discharged from the pump circulates through the coolant passage. The radiator is configured such that the coolant circulating through the coolant passage is introduced into the radiator. The radiator is configured to cool the coolant. The control valve is configured to adjust a flow rate of the coolant to be introduced into the radiator. The control valve includes a first valve, a second valve and a malfunction-diagnosing unit. The first valve is configured to adjust the flow rate of the coolant into the radiator by using a valve member driven by an electric actuator. The second valve is arranged in parallel with the first valve. The second valve is configured to open or close a passage leading to the radiator by using a valve member that is opened in accordance with one or both of a pressure or a temperature of the coolant. The malfunction-diagnosing unit is configured to detect a valve-stuck malfunction of the first valve. An output of the engine is limited to an output equal to or less than a limiting value that is determined on a basis of a maximum flow rate of the coolant introduced into the radiator from the second valve when the valve-stuck malfunction of the first valve occurs.

DETAILED DESCRIPTION

An engine-controlling device according to an example of the present invention will hereinafter be described.

The engine-controlling device according to the example collectively controls an engine that is installed as a power source for travelling in an automobile such as a car and auxiliary machines thereof.

The engine includes a water cooling system that causes cooling water (coolant) to circulate and that thereby cools portions of a main body and the auxiliary machines that are need to be cooled.

The cooling system also has a function of heating air for heating the inside of a vehicle cabin and a CVT field in a manner in which the cooling water that is heated by waste heat of the engine is used as a heat source.

A long-life coolant (LLC) that contains water as a main component and an additive to improve antifreeze properties and rust resistance is used as the cooling water.

Figure 1:
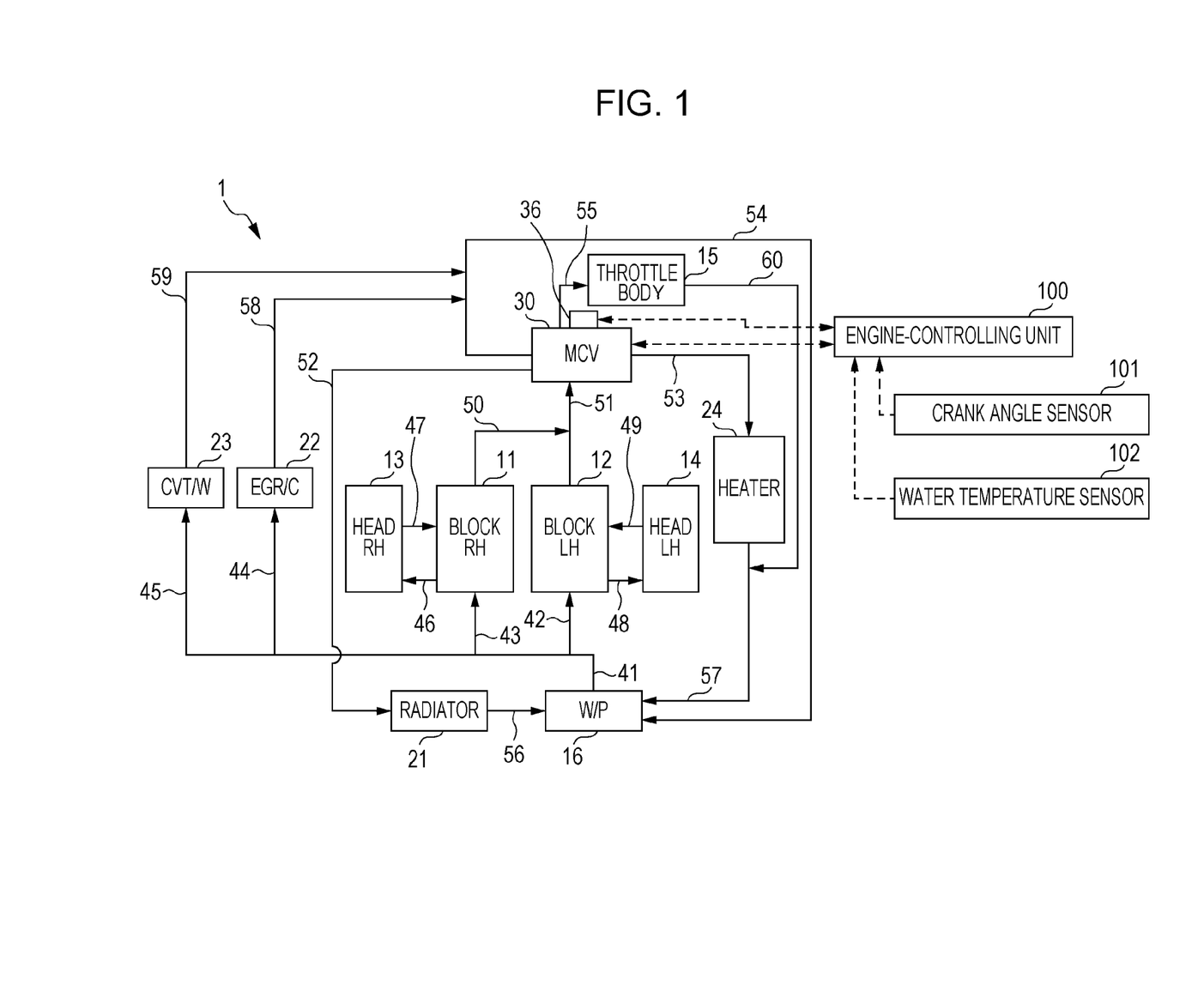
FIG. 1 illustrates the structure of a cooling system of an engine including an engine-controlling device according to an example of the present invention.

FIG. 1 illustrates the structure of the cooling system of the engine including the engine-controlling device according to the example.

In FIG. 1, solid arrows represent the flow of the cooling water, and dashed arrows represent the flow of electric signals.

An example of an engine 1 is a four-stroke, flat-four gasoline direct injection engine.

The engine 1 includes a cylinder block RH11, a cylinder block LH12, a cylinder head RH13, a cylinder head LH14, a throttle body 15, and a water pump 16.

The cylinder block RH11 and the cylinder block LH12 are respectively disposed on the right-hand side and the left-hand side with a crankshaft, not illustrated, which is an output shaft of the engine 1 interposed therebetween.

The cylinder block RH11 and the cylinder block LH12 each include halves of a main bearing that rotatably supports a journal of the crankshaft.

The cylinder block RH11 includes a first cylinder and a third cylinder.

The cylinder block LH12 includes a second cylinder and a fourth cylinder.

In the cylinder block RH11 and the cylinder block LH12, water jackets that are water passages are formed in regions on a combustion chamber side of the cylinders, and the cooling water passes therethrough.

The cylinder head RH13 and the cylinder head LH14 are disposed at end portions of the cylinder block RH11 and the cylinder block LH12 on the opposite side of the crankshaft.

The cylinder head RH13 and the cylinder head LH14 each include a combustion chamber, intake and exhaust ports, intake and exhaust valves, a valve train, a fuel injector, and a spark plug.

In the cylinder head RH13 and the cylinder head LH14, water jackets in communication with the water jackets of the cylinder block RH11 and the cylinder block LH12 are formed to cool, for instance, each combustion chamber.

The cooling water that has cooled each combustion chamber returns to the cylinder block RH11 and the cylinder block LH12.

The throttle body 15 accommodates a throttle valve that adjusts the amount of air to be inhaled into the engine 1.

The throttle valve is a butterfly valve disposed in an intake system that admits fresh air (air for combustion) into the engine 1.

The cooling water passes through the throttle body 15, for instance, to prevent freezing thereof.

The water pump 16 pressurizes the cooling water in response to rotation of the crankshaft of the engine 1 and discharges the cooling water.

The water pump 16 includes a propeller (impeller) that operates in conjunction with the crankshaft by using a power transmitter such as a belt. The amount of the discharged cooling water and a discharge pressure are increased in accordance with an increase in the rotational speed (the number of revolutions) of the crankshaft.

A radiator 21, an EGR cooler 22, a CVT warmer 23, a heater 24, and a multi-flow control valve 30, for instance, are disposed on the cooling water passage of the engine 1.

The radiator 21 is a heat exchanger that is disposed at a front portion of a vehicle body.

The radiator 21 is formed of tubes through which the cooling water passes and fins that are each formed of a thin plate of, for instance, an aluminum alloy and that are disposed between the tubes.

The radiator 21 cools the cooling water in a manner in which heat is exchanged between air flowing through the vehicle body during travelling (air during travelling) and the cooling water.

The EGR cooler 22 is disposed in an exhaust gas recirculation (EGR) system that extracts part of exhaust gas (burned gas) from the exhaust system of the engine 1 and that mixes the extracted exhaust gas with the fresh air flowing through the intake system to cool the exhaust gas (EGR gas) mixed with the fresh air.

The EGR cooler 22 is a heat exchanger that cools the EGR gas by using heat conduction from the EGR gas to the cooling water.

The CVT warmer 23 heats a CVT fluid, which is a working fluid, by using the cooling water of the engine 1 as a heat source and decreases the viscosity of the CVT fluid to reduce friction of a continuously variable transmission (CVT) that transmits the output of the engine 1 to change the speed.

The CVT warmer 23 is a heat exchanger that conducts heat from the cooling water to the CVT fluid.

The heater 24 is a heat exchanger that heats air that a blower fan, not illustrated, admits into the vehicle cabin by using the cooling water as a heat source to heat the inside of the vehicle cabin.

The cooling water from the main machine of the engine 1 is introduced into the multi-flow control valve (MCV) 30. The multi-flow control valve 30 supplies the cooling water to a radiator passage leading to the radiator 21, a heater passage leading to the heater 24, and a bypass passage leading to neither the radiator 21 nor the heater 24.

A part of the cooling water introduced into the multi-flow control valve 30 always passes through the throttle body 15.

The function and structure of the multi-flow control valve 30 will be described in detail later.

The structure of each passage and other components that form the cooling water passage of the engine 1 will now be described.

The cooling water discharged from the water pump 16 is first introduced into a passage 41.

The passage 41 branches into passages 42 to 45.

The cooling water is introduced into the cylinder block LH12 via the passage 42.

The cooling water is introduced into the cylinder block RH11 via the passage 43.

The cooling water is introduced into the EGR cooler 22 via the passage 44.

The cooling water is introduced into the CVT warmer 23 via the passage 45.

The cooling water introduced into the cylinder block RH11 is introduced into the cylinder head RH13 via a passage 46 and subsequently returns to the cylinder block RH11 via a passage 47.

The cooling water introduced into the cylinder block LH12 is introduced into the cylinder head LH14 via a passage 48 and subsequently returns to the cylinder block LH12 via a passage 49.

A passage 50 into which the cooling water is discharged from the cylinder block RH11 joins a passage 51 into which the cooling water is discharged from the cylinder block LH12. The cooling water is introduced into the multi-flow control valve 30 via the passages 50 and 51.

The passage 51 to a passage 55 are coupled to the multi-flow control valve 30.

The passage 52 is the radiator passage through which the cooling water is introduced from the multi-flow control valve 30 into the radiator 21.

The cooling water that has passed through the radiator 21 returns to an entrance side of the water pump 16 via a passage 56.

The passage 53 is the heater passage through which the cooling water is introduced from the multi-flow control valve 30 into the heater 24.

The cooling water that has passes through the heater 24 returns to the entrance side of the water pump 16 via a passage 57.

The passage 54 is the bypass passage through which the cooling water returns to the entrance side of the water pump 16 without passing through the heat exchangers such as the radiator 21 and the heater 24.

The cooling water that exits the EGR cooler 22 and the CVT warmer 23 enters the passage 54 via passages 58 and 59 and returns to the water pump 16 via the passage 54.

The cooling water is introduced into the throttle body 15 through the passage 55.

The cooling water that has passed through the throttle body 15 enters the passage 57 via a passage 60 and returns to the water pump 16 via the passage 57.

The function of the multi-flow control valve 30 will now be described in more detail.

Figure 3:
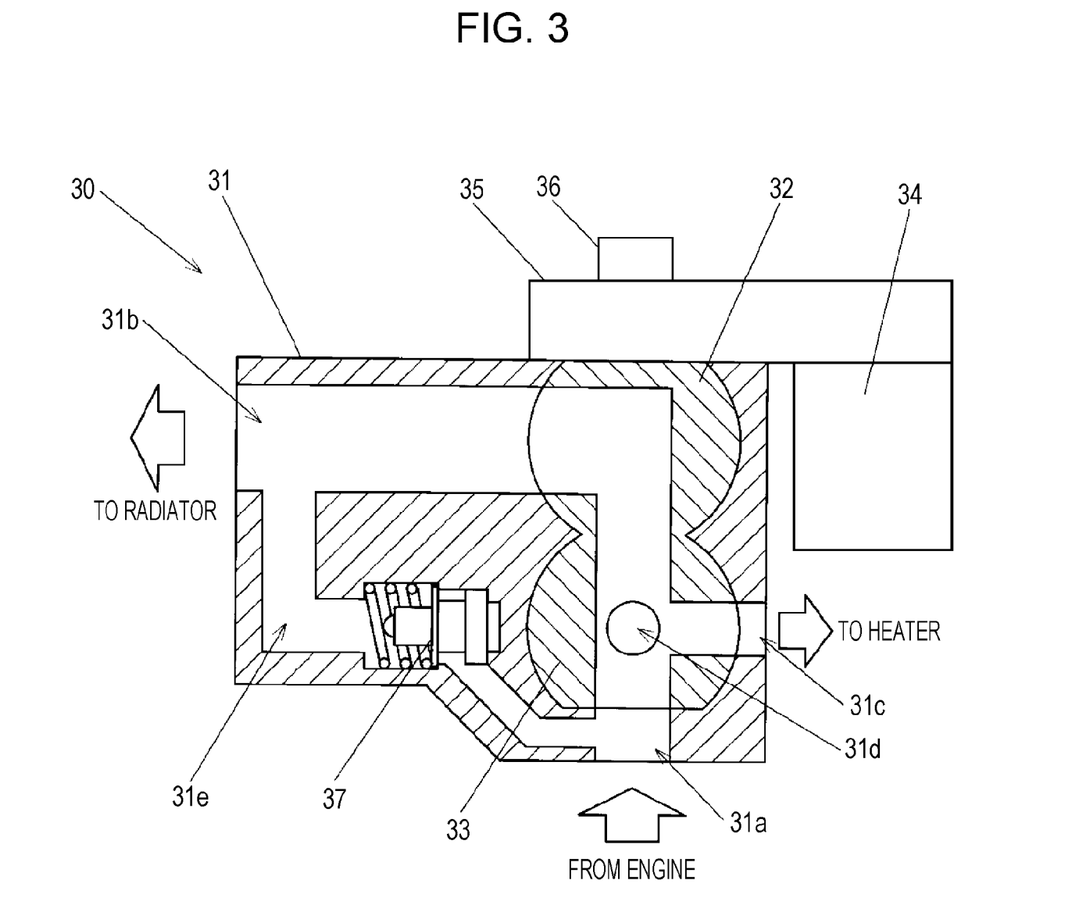
FIG. 3 is a schematic sectional view of the multi-flow control valve of the cooling system according to the example.

The multi-flow control valve 30 can change the degree of opening of a radiator port 31b to which the passage 52 is coupled, a bypass port 31d to which the passage 54 is coupled, and a heater port 31c to which the passage 53 is coupled in a manner in which an input shaft is rotated by using a motor 34.

The cooling water is introduced into the throttle body 15 via a port (not illustrated in FIG. 3) to which the passage 55 is coupled, and the port always opens (in a state where the cooling water can pass therethrough).

The angular position of the input shaft of the multi-flow control valve 30 is referred to as the "degree of MCV opening and will now be described.

The multi-flow control valve 30 is driven by the motor 34, which is an electric actuator, such that the degree of MCV opening is substantially equal to the target degree of MCV opening that an engine-controlling unit 100 instructs.

The engine-controlling unit (ECU) 100 is a control device that collectively controls the engine 1 and the auxiliary machines thereof.

The engine-controlling unit 100 has a function of controlling, for instance, the degree of throttle valve opening of the engine 1, a fuel injection quantity, a fuel injection timing, an ignition timing, a boost pressure, an EGR quantity, and a valve timing to adjust the output of the engine 1.

In a normal operation, the engine-controlling unit 100 controls the output such that an actual torque is substantially equal to a driver-applied torque determined on the basis of, for instance, a manipulated variable of an accelerator pedal, not illustrated.

The engine-controlling unit 100 includes an information processing unit such as a CPU, storage units such as RAM and ROM, an input-output interface, and a bus that couples these components to each other.

A crank angle sensor 101, a water temperature sensor 102, and an opening degree sensor 36 (described later) are coupled to the engine-controlling unit 100, and the output of each sensor can be obtained.

The crank angle sensor 101 is disposed at an end portion of the crankshaft.

The crank angle sensor includes a sensor plate that is mounted on the crankshaft and that has teeth that are radially arranged, and a magnetic pickup that faces the teeth of the sensor plate.

The crank angle sensor 101 outputs a pulse signal whenever the teeth of the sensor plate pass near a sensor part of the magnetic pickup.

The engine-controlling unit 100 calculates the rotational speed (revolution per minute) of the crankshaft on the basis of the pulse signal outputted from the crank angle sensor 101.

The water temperature sensor 102 detects the temperature of the cooling water of the engine 1.

The water temperature sensor 102 includes a thermistor whose resistance varies inversely with the temperature.

Figure 2:
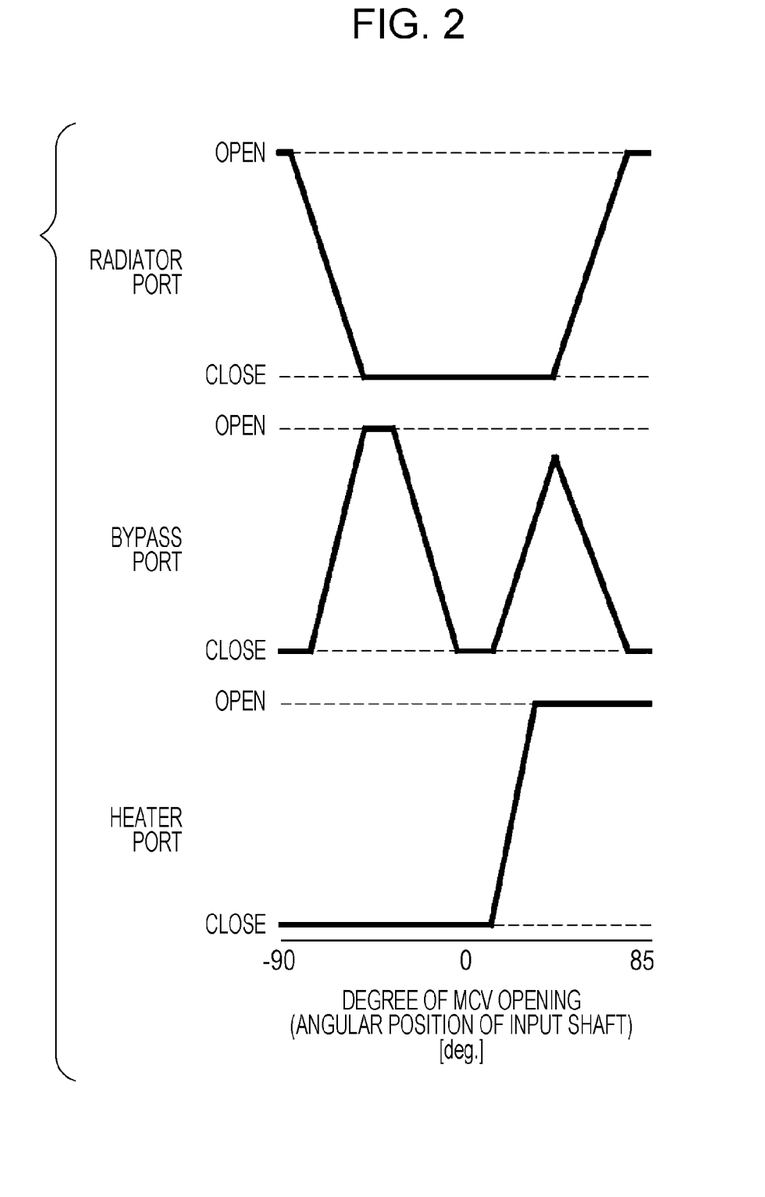
FIG. 2 is a flow diagram of a multi-flow control valve of the cooling system according to the example.

FIG. 2 is a flow diagram of the multi-flow control valve of the cooling system according to the example.

In FIG. 2, the horizontal axis represents the angular position (phase) of the input shaft of the multi-flow control valve 30. This angular position is substantially equal to the angular position of ball valves 32 and 33 described later.

The vertical axis represents the degree of opening of the radiator port 31b, the bypass port 31d, and the heater port 31c.

As illustrated in FIG. 2, the degree of MCV opening can range, for instance, from −90° to 85°.

The radiator port 31b fully opens when the degree of MCV opening is −85° or less.

When the degree of MCV opening is −85° to −50°, the degree of opening of the radiator port decreases in proportion to an increase in the degree of MCV opening.

When the degree of MCV opening is −50° to 30°, the radiator port fully closes.

When the degree of MCV opening is 30° to 80°, the degree of opening of the radiator port increases in proportion to an increase in the degree of MCV opening. When the degree of MCV opening is 80° or more, the radiator port fully opens.

The bypass port 31d fully closes when the degree of MCV opening is −80° or less.

When the degree of MCV opening is −80° to −50°, the degree of opening of the bypass port increases in proportion to an increase in the degree of MCV opening. When the degree of MCV opening is −50°, the bypass port fully opens.

When the degree of MCV opening is −50° to −40°, the bypass port fully opens.

When the degree of MCV opening is −40° to −5°, the degree of opening of the bypass port decreases in proportion to an increase in the degree of MCV opening. When the degree of MCV opening is −5° to 10°, the bypass port fully closes.

When the degree of MCV opening is 10° to 30°, the degree of opening of the bypass port increases in proportion to an increase in the degree of MCV opening. When the degree of MCV opening is 30°, the degree of opening of the bypass port is about 80%.

When the degree of MCV opening is 30° to 80°, the degree of opening of the bypass port decreases in proportion to an increase in the degree of MCV opening. When the degree of MCV opening is 80° or more, the bypass port fully closes.

The heater port 31c fully closes when the degree of MCV opening is 10° or less.

When the degree of MCV opening is 10° to 25°, the degree of opening of the heater port increases in proportion to an increase in the degree of MCV opening. When the degree of MCV opening is 25° or more, the heater port fully opens.

FIG. 3 is a schematic sectional view of the multi-flow control valve of the cooling system according to the example.

The multi-flow control valve 30 includes a valve body 31, the ball valves 32 and 33, the motor 34, a speed reduction mechanism 35, the opening degree sensor 36, and a relief valve 37.

The valve body 31 is a main body of the multi-flow control valve 30, which is a base on which each component is mounted.

The valve body 31 has, for instance, an inlet port 31a, the radiator port 31b, the heater port 31c, the bypass port 31d, and a bypass passage 31e.

The inlet port 31a is a port via which the cooling water is introduced from the passage 51.

The passages 52, 53, and 54 are coupled to the radiator port 31b, the heater port 31c, and the bypass port 31d, respectively.

The bypass passage 31e is a passage through which the cooling water from the inlet port 31a bypasses the ball valves 32 and 33 and flows to the radiator port 31b.

The valve body 31 has spherical valve seats that are in contact with the outer circumferential surfaces of the ball valves 32 and 33 and that permit the ball valves 32 and 33 to rotate while sealing the cooling water.

Each of the ball valves 32 and 33 is a valve member that has the outer circumferential surface formed in a spherical shape, that opens or closes the passages leading to the radiator port 31b, the heater port 31c, and the bypass port 31d from the inlet port 31a, and that adjusts the degree of opening in an open state.

The ball valve 32 functions as a first valve according to the example of the present invention in conjunction with the motor 34 and the speed reduction mechanism 35.

The multi-flow control valve 30 has a two-stage rotary valve structure. The ball valves 32 and 33 can rotate about the same central axis with respect to the valve body 31.

The cooling water enters the inside of the ball valves 32 and 33 from the inlet port 31a.

The ball valves 32 and 33 each have a slit portion that permits the cooling water to exit in a predetermined angle range from the central axis.

Each slit portion enables the corresponding port and the inlet port 31a to be in communication with each other via the inside of the ball valves 32 and 33 when the angular positions of the ball valves 32 and 33 are within a predetermined open range.

The slit portion of the ball valve 32 opens or closes the radiator port 31b. The slit portion of the ball valve 33 opens or closes the heater port 31c and the bypass port 31d.

The motor 34 is an electric actuator that drives the ball valves 32 and 33 such as a DC motor.

The speed reduction mechanism 35 includes a row of gears that transmits rotation of the output shaft of the motor 34 to the ball valves 32 and 33 so as to decrease the rotational speed.

The opening degree sensor 36 includes an angle encoder that detects the angular position of the ball valves 32 and 33 with respect to the valve body 31.

The output of the opening degree sensor 36 is sent to the engine-controlling unit 100.

The engine-controlling unit 100 performs feedback control of the motor 34 such that the degree of MCV opening detected by the opening degree sensor 36 becomes equal to the target degree of opening.

The engine-controlling unit 100 has a diagnosis function of detecting a valve-stuck malfunction of the multi-flow control valve 30 in the case where the opening degree sensor 36 does not detect a variation in the angle of the ball valves 32 and 33 even when the motor 34 is instructed to operate. The malfunction of the multi-flow control valve 30 means invariable opening-degree information, for instance, a malfunction (invariable output value) of the opening degree sensor 36, a malfunction (invariable actual opening-degree) of the ball valves 32 and 33, and a malfunction (immobility) of the motor 34.

The relief valve 37 is a mechanical valve for fail safe that is disposed on the bypass passage 31e and that opens in accordance with the temperature and pressure of the cooling water.

The relief valve 37 functions as a second valve according to the example of the present invention.

The relief valve 37 includes a wax element (thermopellet), which is a thermosensitive element, and drives a valve member such that the valve member opens in accordance with thermal expansion of the wax element.

The relief valve 37 also functions as a pressure relief valve that opens when pressure on an upstream side (side of the inlet port 31a) is a predetermined value larger than pressure on a downstream side (side of the radiator port 31b).

Control when the multi-flow control valve 30 of the engine-controlling device according to the example malfunctions will now be described.

Figure 4:
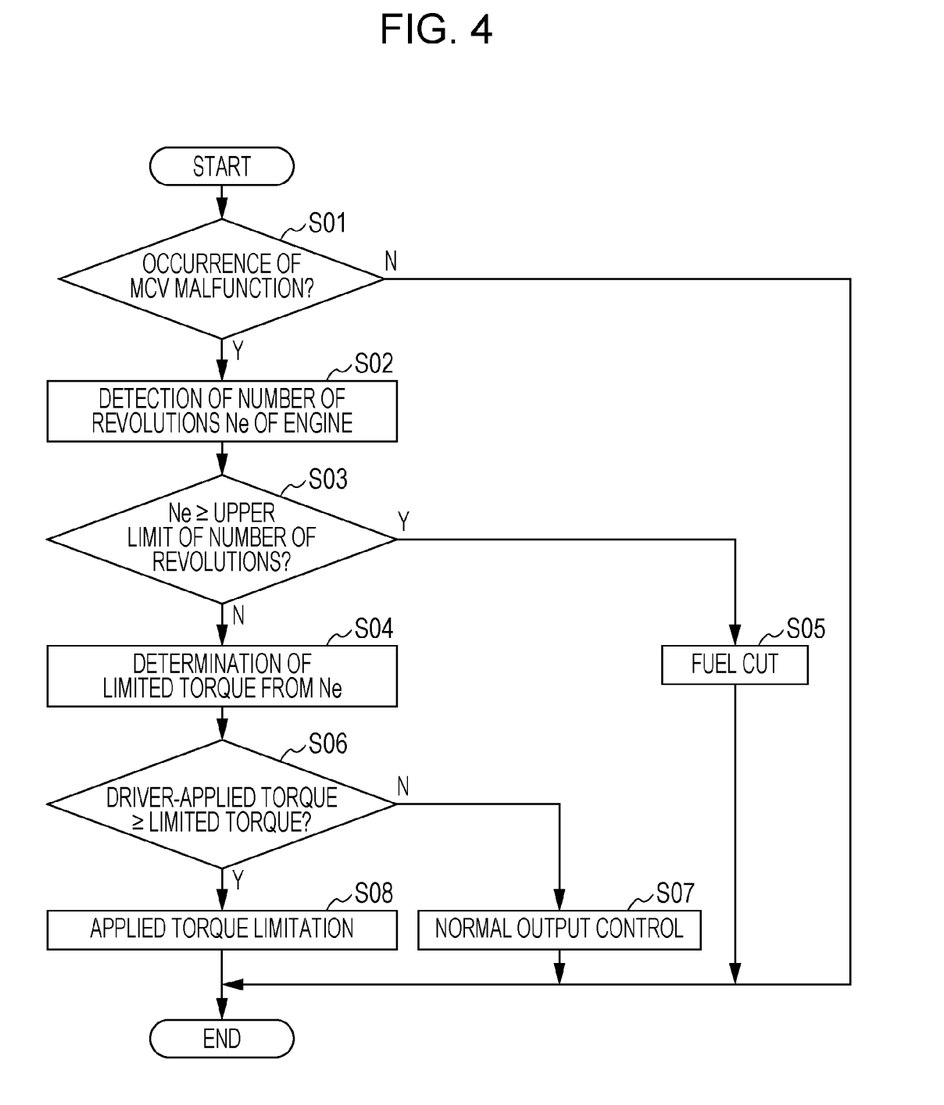
FIG. 4 is a flow chart illustrating an operation of the engine-controlling device according to the example when the multi-flow control valve malfunctions.

FIG. 4 is a flow chart illustrating an operation of the engine-controlling device according to the example when the multi-flow control valve malfunctions.

The steps are described below in order.

<Step S01: Decision of Occurrence of MCV Malfunction>

The engine-controlling unit 100 decides whether the multi-flow control valve 30 malfunctions by using the above diagnosis function.

In the case where the malfunction occurs, the flow proceeds to step S02. In the case where no malfunction occurs, a series of processes is finished (return).

<Step S02: Detection of Number of Revolutions Ne of Engine>

The engine-controlling unit 100 detects the number of revolutions Ne of the engine, that is, the rotational speed (revolution per minute) of the crankshaft, which is the output shaft of the engine 1, on the basis of the output of the crank angle sensor 101.

Subsequently, the flow proceeds to step S03.

<Step S03: Decision of Upper Limit of Number of Revolutions Ne of Engine>

The engine-controlling unit 100 compares the number of revolutions Ne of the engine that is detected at step S02 with a predetermined upper limit of the number of revolutions.

The upper limit of the number of revolutions is determined in consideration for the number of revolutions at which there is a risk of, for instance, detachment of a hose due to an increase in the pressure of the cooling water passage.

In the case where the number of revolutions Ne of the engine is equal to or more than the upper limit of the number of revolutions, the flow proceeds to step S05. In the case where the number of revolutions Ne is less than the upper limit of the number of revolutions, the flow proceeds to step S04.

<Step S04: Determination of Limited Torque from Number of Revolutions Ne of Engine>

The engine-controlling unit 100 determines a limited torque, which is the upper limit of the target output torque of the engine 1, on the basis of the number of revolutions Ne of the engine.

The limited torque is determined on the basis of the maximum flow rate of the cooling water that can be introduced into the radiator 21 via only the bypass passage 31e and the relief valve 37 such that overheating does not occur at this flow rate.

The larger the number of revolutions Ne of the engine, the larger the amount of the cooling water discharged from the water pump 16, and the larger the flow rate of the cooling water passing through the relief valve 37.

For this reason, the limited torque is determined so as to increase in accordance with an increase in the number of revolutions Ne of the engine.

For instance, the limited torque is determined so as to vary stepwise or continuously in accordance with the number of revolutions Ne of the engine.

After the limited torque is determined, the flow proceeds to step S06.

<Step S05: Fuel Cut>

The engine-controlling unit 100 immediately decreases the number of revolutions Ne of the engine and cancels the fuel injection (fuel cut) to prevent a malfunction such as detachment of the hose.

Subsequently, a series of processes is finished (return).

<Step S06: Decision of Driver-Applied Torque>

The engine-controlling unit 100 compares the driver-applied torque determined, for instance, on the basis of the degree of opening of the accelerator pedal with the limited torque determined at step S04.

In the case where the driver-applied torque is equal to or more than the limited torque, the flow proceeds to step S08. In the case where the driver-applied torque is less than the limited torque, the flow proceeds to step S07.

<Step S07: Normal Output Control>

The engine-controlling unit 100 performs normal control of the output of the engine 1 such that the actual torque of the engine 1 becomes substantially equal to the driver-applied torque.

Subsequently, a series of processes is finished (return).

<Step S08: Applied Torque Limitation>

The engine-controlling unit 100 controls the output of the engine 1 such that the actual torque of the engine 1 becomes equal to or less than the limited torque (for instance, substantially equal to the limited torque) regardless of the driver-applied torque.

Subsequently, a series of processes is finished (return).

According to the example, the following effects can be achieved as described above. (1) In the case where the multi-flow control valve 30 malfunctions, the amount of heat generated from the engine 1 can be limited to be equal to or less than the amount of heat radiated from the radiator 21 in a manner in which the output of the engine 1 is limited on the basis of the maximum flow rate of the cooling water introduced from the relief valve 37 into the radiator 21, and the engine 1 can be prevented from overheating with certainty. (2) The limited torque can be appropriately determined in accordance with the flow rate of the cooling water (amount of the cooling water discharged from the pump) that increases in accordance with an increase in the number of revolutions Ne of the engine in a manner in which the limited torque is determined so as to increase in accordance with an increase in the number of revolutions Ne of the engine, and an excessive limitation of the output can be prevented to ensure an output performance during travelling in a limp-home mode. (3) In the case where the number of revolutions Ne of the engine is equal to or more than the upper limit of the number of revolutions, fuel cut enables a malfunction such as detachment of the hose to be prevented from occurring due to an excessively increased amount of the cooling water discharged from the water pump 16 in a state where a pressure loss in the cooling water passage is increased due to the stuck ball valve 32.

(Modification)

The present invention is not limited to the example described above. Various modifications and alternations can be made, and these modifications and alternations are within the technical scope of the present invention.

The structure of the engine and the cooling system is not limited to the example described above and can be appropriately changed.

For instance, a cylinder layout, the number of the cylinders, the structure of the cooling water passage can be appropriately changed.

For instance, the structure of the control valve, the number of the ports, the structure of the valve member that opens or closes the ports are not particularly limited and can be appropriately changed.

According to the example, the relief valve opens in accordance with the temperature and the pressure. However, the relief valve is not limited thereto. The relief valve can open in accordance with at least one of the temperature or the pressure.

The present invention is not limited to a gasoline engine and can be used for a diesel engine and other water-cooled internal combustion engines.

According to the example, the fuel is cut in the case where the number of revolutions exceeds the upper limit of the number of revolutions. However, the number of revolutions may be decreased in another way. For instance, the number of revolutions may be decreased in a manner in which ignition is cut or the throttle valve is closed.

The coolant is not limited to the cooling water and may be another liquid.

The invention claimed is:

1. An engine-controlling device, comprising:
    a pump configured to discharge a coolant of an engine in conjunction with an output shaft of the engine;
    a coolant passage configured such that the coolant discharged from the pump circulates through the coolant passage;
    a radiator configured such that the coolant circulating through the coolant passage is introduced into the radiator, the radiator being configured to cool the coolant; and
    a control valve configured to adjust a flow rate of the coolant to be introduced into the radiator, the control valve comprising:
        a first valve configured to adjust the flow rate of the coolant into the radiator by using a valve member driven by an electric actuator;
        a second valve arranged in parallel with the first valve and configured to open or close a passage leading to the radiator by using a valve member that is opened in accordance with one or both of a pressure and a temperature of the coolant; and a malfunction-diagnosing unit configured to detect a valve-stuck malfunction of the first valve when a variation in an angular position of the first valve is undetected, wherein an output of the engine is limited to an output equal to or less than a limiting value that is determined on a basis of a maximum flow rate of the coolant introduced into the radiator from the second valve when the valve-stuck malfunction of the first valve occurs.

2. The engine-controlling device according to claim 1, wherein the limiting value is determined so as to increase in accordance with an increase in a rotational speed of the output shaft.

3. The engine-controlling device according to claim 1, wherein a rotational speed of the output shaft of the engine is limited to a rotational speed equal to or less than a predetermined upper limit when the valve-stuck malfunction of the first valve occurs.

4. The engine-controlling device according to claim 2, wherein a rotational speed of the output shaft of the engine is limited to a rotational speed equal to or less than a predetermined upper limit when the valve-stuck malfunction of the first valve occurs.

5. The engine-controlling device according to claim 1, further comprising a sensor configured to detect the angular position of the first valve.

6. The engine-controlling device according to claim 5, wherein, in the valve-stuck malfunction of the first valve, the sensor fails to detect the angular position of the first valve.

7. The engine-controlling device according to claim 1, further comprising a motor that drives the first valve,
wherein, in the valve-stuck malfunction of the first valve, the motor malfunctions.

8. The engine-controlling device according to claim 1, wherein the first valve comprises a ball valve and the second valve comprises a relief valve.

9. The engine-controlling device according to claim 8, wherein the relief valve opens when a pressure on a side of the engine reaches a predetermined value that is larger than a pressure on a side of the radiator.

10. The engine-controlling device according to claim 1, wherein the valve member of the second valve opens in accordance with the pressure of the coolant.

11. The engine-controlling device according to claim 1, wherein the valve member of the second valve opens in accordance with the temperature of the coolant.

12. An engine-controlling system, comprising:
a pump configured to discharge a coolant of an engine in conjunction with an output shaft of the engine;
a coolant passage configured such that the coolant discharged from the pump circulates through the coolant passage;
a radiator configured such that the coolant circulating through the coolant passage is introduced into the radiator to cool the coolant;
a first valve configured to adjust a flow rate of the coolant into the radiator by a valve member;
a second valve arranged in parallel with the first valve and configured to open or close a passage leading to the radiator by another valve member that is opened in accordance with at least one of a pressure of the coolant and a temperature of the coolant;
a sensor configured to measure a variation in an angular position of the first valve to detect a valve-stuck malfunction of the first valve,
wherein an output of the engine is limited to an output equal to or less than a limiting value that is determined on a basis of a maximum flow rate of the coolant introduced into the radiator from the second valve when the valve-stuck malfunction of the first valve occurs when the variation in the angular position of the first valve is undetected.

13. The engine-controlling system according to claim 12, further comprising:
a malfunction-diagnosing unit configured to detect the valve-stuck malfunction of the first valve.

14. The engine-controlling system according to claim 12, wherein, in the valve-stuck malfunction of the first valve, the sensor fails to detect the angular position of the first valve.

15. The engine-controlling system according to claim 12, wherein the another valve member of the second valve opens in accordance with the pressure of the coolant.

16. The engine-controlling system according to claim 12, wherein the first valve comprises a ball valve and the second valve comprises a relief valve.

17. A control valve configured to adjust a flow rate of a coolant of an engine into a radiator, the control valve comprising:
a first valve configured to adjust the flow rate of the coolant by a valve member driven by an electric actuator;
a second valve arranged in parallel with the first valve and configured to open or close a passage leading to the radiator by another valve member that is opened in accordance with at least one of a pressure of the coolant and a temperature of the coolant; and
a sensor configured to detect an angular position of the first valve,
wherein the pump is configured to discharge a coolant in conjunction with an output shaft of the engine,
wherein a coolant passage is configured such that the coolant discharged from the pump circulates through the coolant passage,
wherein the radiator is configured such that the coolant circulating through the coolant passage is introduced into the radiator to cool the coolant, and
wherein an output of the engine is limited to an output equal to or less than a limiting value that is determined on a basis of a maximum flow rate of the coolant introduced into the radiator from the second valve when a valve-stuck malfunction of the first valve occurs as the variation in the angular position of the first valve is undetected.

18. The control valve according to claim 17, further comprising a malfunction-diagnosing unit configured to detect the valve-stuck malfunction of the first valve when the variation in the angular position of the first valve is undetected.

19. The control valve according to claim 18, wherein, in the valve-stuck malfunction of the first valve, the sensor fails to detect the angular position of the first valve.

20. The control valve according to claim 17, wherein the first valve comprises a ball valve and the second valve comprises a relief valve.

* * * * *